Patented Nov. 1, 1949

2,486,562

UNITED STATES PATENT OFFICE 2,486,562

NONDUSTING WATER-SOLUBLE ORGANIC DYESTUFF AND METHOD OF MAKING SAME

Joseph M. Iamarino, deceased, late of Buffalo, N. Y., by Helen M. Iamarino, administratrix, Buffalo, N. Y., assignor to Allied Chemical & Dye Corporation, New York, N. Y., a corporation of New York No Drawing. Application February 24, 1947, Serial No. 730,574

13 Claims. (Cl. 260—394)

This invention relates to improvements in organic dyestuffs in the form of non-dusting solid compositions, and especially powders, comprising essentially a water-soluble organic dyestuff and an anti-dusting agent.

The water-soluble dyestuffs, as ordinarily placed on the market in the form of dry granulated or powdered solids, often containing in admixture therewith diluents and/or dyeing assistants (for example, common salt, Glauber's salt, soda ash, organic wetting and/or dispersing agents, etc.) generally have the objectionable property of giving rise to a fine powder or dust. When such dyestuffs are handled in the open, as is generally done in standardizing, weighing and packaging them, or in preparing dyebaths or solutions, pastes and the like from them, the fines or dusts rise and remain suspended in the air for extended periods of time. This is not only annoying but leads to loss of valuable material and contamination of the surroundings, with resultant spoilage of other materials in the vicinity, and creates health and explosion hazards.

It has been proposed to inhibit the dusting of dyestuff powders by incorporating therewith small amounts of various inorganic and organic substances. Thus, the use of liquid or partially liquid hydrocarbons such as heavy mineral oil, as well as glycerine, calcium chloride, zinc chloride, and other hygroscopic substances, as anti-dusting agents for oxazine dyestuffs, is referred to in German Patent 274,642; the use of various oily and waxy substances as anti-dusting agents for basic dyestuffs is referred to in British Patent 576,100; the use of ethers of diethylene glycol, as well as lower alkyl ethers of acetates or formates of ethylene glycol, as anti-dusting agents for vat dyestuff powders is referred to in U. S. patent 2,090,511; and the use of triethanolamine in forming non-dusting flakes of azo dyes is referred to in U. S. Patent 1,992,185. It has also been proposed to employ esters, ethers, and esterethers of polyglycols (for example, dimethoxytetraethyleneglycol, methoxy-triethyleneglycol acetate, butoxy-diethyleneglycol acetate, ethoxydiethyleneglycol acetate, phenoxy-diethyleneglycol acetate, diethyleneglycol diacetate, the corresponding formates, etc.) as anti-dusting agents for various types of dyestuffs.

None of these anti-dusting agents produces a satisfactory dyestuff composition when employed in connection with water-soluble dyestuffs; that is dyestuffs which, unlike vat, sulfur and pigmentlike dyestuffs, are adequately soluble per se in aqueous dyebaths for effecting dyeing of textile materials. Thus, dyestuff powders containing glycerine and other hygroscopic substances pick up moisture from the atmosphere and lose their free-flowing characteristics. Mineral oil and other oily and waxy substances render the dyestuff powders sticky, greasy or lumpy; they interfere with the wetting-out of the compositions; and they form an oily film in the dyebath and interfere with level dyeing. Others of said antidusting agents are undesirable because of their relative ineffectiveness, requiring such large amounts that the resulting compositions are tacky or even pasty; or because they impart unpleasant odors to the dyestuff powders, especially after standing under storage conditions; or because they induce dermatitis and other undesirable effects upon persons handling the compositions; or because their action is fugitive and disappears in a short time.

The present invention is based upon the discovery that the liquid dialkyl esters of phthalic acids (dialkyl phthalates) in which each of the alkyl groups contains not more than 4 carbon atoms constitute a class of substances particularly effective as anti-dusting agents for water-soluble organic dyestuffs. (As employed herein and in the claims, the term "water-soluble organic dyestuff" means an organic dyestuff which is adequately soluble per se in an aqueous dyebath to effect dyeing of textile material.) Thus they are highly effective for inhibiting the dusting of a wide variety of water-soluble organic dyestuffs; they do not interfere with the wetting-out of powders of the dyestuffs in water, nor produce oily films nor otherwise interfere to any noticeable degree with good dyeing action; they do not render powders of the dyestuffs sticky, greasy, or lumpy; they are fragrant and do not develop obnoxious odors during storage of dyestuff compositions containing them; they are not irritating to the human skin; and they are readily available. Another important advantage of said dialkyl phthalates is their relative insolubility in the water-soluble dyestuffs and the relative insolubility of the water-soluble dyestuffs in said dialkyl phthalates at ordinary temperatures, as shown by agitating 1 part by weight of dyestuff powder with 10 parts by weight of liquid diester of phthalic acid for 10 hours at room temperature. This is of commercial importance in connection with the permanence of the anti-dusting action of the dialkyl phthalates inasmuch as some anti-dusting agents, which exert an anti-dusting action when initially mixed with dyestuffs, lose their effect after a time due to their being absorbed into the interiors of the dyestuff particles.

The dialkyl esters useful in accordance with the present invention include the various symmetrical and unsymmetrical dialkyl esters of the various phthalic acids (ortho-phthalic acid, meta-phthalic acid, and terephthalic acid) in which each of the alkyl groups contains 1 to 4 carbon atoms, which esters are liquids at 20° C. They may be employed individually or in the form of mixtures of two or more of them; and it will be understood that, when a dialkyl ester of a phthalic acid is referred to generically in the claims, said dialkyl esters and mixtures of two or more of them are intended. Those derived from ortho-phthalic acid are the more readily available and the cheaper, and therefore are preferred.

As representative dialkyl esters of phthalic acids useful in accordance with the present invention, there may be mentioned dimethyl ortho-phthalate; diethyl ortho-phthalate; methyl, ethyl ortho-phthalate; dimethyl terephthalate; isopropyl, methyl ortho-phthalate and dibutyl ortho-phthalate. Dimethyl ortho-phthalate is especially preferred inasmuch as it is highly effective as a dust-inhibiting agent; it is readily available and cheap; it has a pleasant odor; and it has sufficient solubility in hot aqueous dyebaths to permit its presence in substantial amounts.

The water-soluble dyestuffs which are advantageously treated in accordance with the present invention include various types of organic dyestuffs which, unlike vat, sulfur and pigment-like dyestuffs, are adequately soluble per se in aqueous dye baths for effecting dyeing of textile materials. In general, and for the most part, such dyestuffs are soluble at least to extent of 1 part in 500 parts by weight of distilled water, at 20° C. The dyestuffs may be, for example, mono-azo dyes, polyazo dyes, anthraquinone dyes, triphenylmethane dyes, acridine dyes, quinoline dyes, stilbene dyes, xanthene dyes, and azine dyes. In general, such dyestuffs are salts of various types. Thus, they include salts of dyestuff acids, especially alkali metal and ammonium salts of dyestuff sulfonic acids, dyestuff carboxylic acids and dyestuff sulfonamides; and also, as in the case of the so-called basic dyestuffs, they include salts formed by combination of dyestuff bases with non-dyeing acids (such as, hydrochloric, acetic and oxalic acids). In some instances the dyestuffs may be in the form of free sulfonic or carboxylic acids or sulfonamides.

The liquid dialkyl ester of phthalic acid may be incorporated with the water-soluble dyestuff in various ways; for example, by stirring, grinding or milling them together, or by mixing the ester with a solution of the dyestuff and drying.

The amount of liquid dialkyl ester of phthalic acid required to render a particular organic water-soluble dyestuff composition substantially non-dusting varies with the individual dyestuff. In general, as little as 1% to 3% of the liquid phthalic acid diester, based on the net weight of the dyestuff, is adequate when intimately mixed with dyestuff compositions of ordinary dustiness. In the case of some dyestuffs which dust badly, however, somewhat larger amounts (not more than 6% of the net weight of the dyestuff) may be required to produce a powder which develops no obnoxious dust on handling. As employed herein and in the claims, the expression "net weight of the dyestuff" refers to the weight of actual coloring matter (undiluted dyestuff).

The invention will be illustrated by the following specific examples in which parts are by weight:

Example 1

98 parts of powdered Alphazurine 2G (color index No. 712) and 2 parts of dimethyl ortho-phthalate were ground in a ball mill for 1 hour. The resulting powder was much less dusty than the untreated dyestuff powder, and dissolved to give a dye bath free from oily films or insoluble particles.

Examples 2 to 12

98 parts of one of each of the following dyestuffs in powdered form were substituted for the Alphazurine 2G in the process of Example 1:

| Example No. | Dyestuff | Color Index No. | Class of Dyestuff | Type of Salt |
| --- | --- | --- | --- | --- |
| 2 | Phosphine 2RN | 793 | Acridine | Mixed Chloride and Sulfate. |
| 3 | Cloth Red B | 262 | Disazo | Sodium Sulfonate. |
| 4 | Buffalo Black NBR | 246 | do | Do. |
| 5 | Erie Black GXOO | 581 | Trisazo | Do. |
| 6 | Erie Red 4B | 448 | Disazo | Do. |
| 7 | Erie Yellow Y | 365 | Stilbene Disazo | Do. |
| 8 | Niagara Sky Blue 6B | 518 | Disazo | Do. |
| 9 | Chrysoidine Y Extra | 20 | Mono-azo | Hydrochloride. |
| 10 | Quinoline Yellow | 801 | Quinoline | Sodium Sulfonate. |
| 11 | Alizarine Blue Black BG | 1,085 | Anthraquinone | Do. |
| 12 | Alizarine Red S | 1,034 | do | Do. |

The resulting powders were much less dusty than the untreated dyestuff powder. They dissolved to give dye baths which were free from oily films or insoluble particles and which gave dyeings at least equal to those of the untreated dyestuff powders.

Examples 13, 14, and 15

95 parts of one of each of the following monoazo dyestuffs in powdered form and 5 parts of dimethyl ortho-phthalate were ground in a ball mill for 1 hour:

| Example No. | Dyestuff | Color Index No. | Type of Salt |
| --- | --- | --- | --- |
| 13 | Wool Yellow X | 640 | Sodium Sulfonate and Carboxylate. |
| 14 | Azo Yellow A5W | 146 | Sodium Sulfonate. |
| 15 | Alizarol Brown RH Conc | 98 | Do. |

The resulting powder was much less dusty than the untreated dyestuff powder and dissolved to give a dye bath free from oily films or insoluble particles.

It will be realized by those skilled in the art that the invention is not limited to the details of the foregoing examples and that changes in the specific dyestuffs and dialkyl phthalates employed, method of incorporating the dialkyl phthalate with the dyestuffs, and proportions of dialkyl phthalate to dyestuff may be varied within the scope of the appended patent claims.

Thus, other water-soluble dyestuffs may be substituted for the dyestuffs employed in the foregoing examples; for instance:

| Dyestuff | Color Index No. | Class of Dyestuff | Type of Salt |
| --- | --- | --- | --- |
| Erie Yellow 2 RF | 620 | Stilbene | Sodium Sulfonate. |
| Fast Acid Green B | 667 | Triphenylmethane | Do. |
| Methyl Violet 2B | 680 | ...do | Hydrochloride. |
| Rhodamine B Conc | 749 | Xanthene | Do. |
| Rhodamine 6G | 752 | ...do | Do. |
| Wool Fast Blue BL | 833 | Azine | Sodium Sulfonate. |
| Safranine A Extra | 841 | ...do | Chloride. |
| Alizarine Sapphire | 1,054 | Anthraquinone | Sodium Sulfonate. |
| Chromolan Yellow NGR | [1] None | Chromiferous Azo | Do. |

[1] Schultz, 7th ed., 2nd supplement (1939) No. 131b.

The dimethyl ortho-phthalate employed in the above examples may be replaced by diethyl ortho-phthalate, dibutyl ortho-phthalate, or others of the dialkyl phthalates referred to above.

The dyestuff compositions included in the present invention may include, besides the water-soluble dyestuff and dialkyl phthalate, other substances commonly present in dyestuff compositions of this type; such as, diluents (e. g. sodium chloride, Glauber's salt, sugar, dextrine, etc.), wetting agents, dispersing agents, dyeing assistants, etc. Accordingly, when in the claims the dyestuff compositions are defined as "comprising essentially" the dyestuff and the dialkyl phthalate, they will be understood to include compositions containing such other substances.

What is claimed is:

1. An organic dyestuff composition in the form of a substantially uniform, substantially non-dusting solid comprising essentially an intimate mixture of particles of a water-soluble organic dyestuff and not more than 6%, based on the net weight of said dyestuff, of a liquid dialkyl ester of a phthalic acid having not more than 4 carbon atoms in each alkyl group.

2. An organic dyestuff composition in the form of a substantially uniform, substantially non-dusting solid comprising essentially an intimate mixture of particles of a water-soluble organic dyestuff and not more than 6%, based on the net weight of said dyestuff, of a dimethyl phthalate.

3. An organic dyestuff composition in the form of a substantially uniform, substantially non-dusting powder comprising essentially an intimate mixture of particles of a water-soluble organic dyestuff and not more than 6%, based on the net weight of said dyestuff, of a liquid dialkyl ester of ortho-phthalic acid having not more than 4 carbon atoms in each alkyl group.

4. An organic dyestuff composition in the form of a substantially uniform, substantially non-dusting powder comprising essentially an intimate mixture of particles of a water-soluble organic dyestuff and 1% to 5%, based on the net weight of said dyestuff, of dimethyl ortho-phthalate.

5. An organic dyestuff composition in the form of a substantially uniform, substantially non-dusting powder comprising essentially an intimate mixture of particles of a water-soluble organic dyestuff which is a salt of a dyestuff base and 1% to 5%, based on the net weight of said dyestuff, of dimethyl orthophthalate.

6. An organic dyestuff composition in the form of a substantially uniform, substantially non-dusting powder comprising essentially an intimate mixture of particles of a water-soluble triphenylmethane dyestuff and 1% to 5%, based on the net weight of said dyestuff, of dimethyl ortho-phthalate.

7. An organic dyestuff composition in the form of a substantially uniform, substantially non-dusting powder comprising essentially an intimate mixture of particles of a water-soluble organic dyestuff which is a salt of a dyestuff acid and 1% to 5%, based on the net weight of said dyestuff, of dimethyl ortho-phthalate.

8. An organic dyestuff composition in the form of a substantially uniform, substantially non-dusting powder comprising essentially an intimate mixture of particles of a water-soluble organic dyestuff which is a sodium salt of a dyestuff sulfonic acid and 1% to 5%, based on the net weight of said dyestuff, of dimethyl ortho-phthalate.

9. A method of inhibiting dusting of a water-soluble organic dyestuff which comprises forming a substantially uniform mixture of particles of said dyestuff with a liquid dialkyl ester of a phthalic acid having not more than 4 carbon atoms in each alkyl group, the amount of said ester being at least sufficient to inhibit dusting of said dyestuff but not exceeding 6% of the net weight of said dyestuff.

10. A method according to claim 9 wherein the dyestuff is mixed with 1% to 5%, based on the net weight of the dyestuff, of dimethyl ortho-phthalate.

11. A method of inhibiting dusting of a water-soluble triphenylmethane dyestuff which comprises milling said dyestuff with a liquid dialkyl ester or ortho-phthalic acid having not more than 4 carbon atoms in each alkyl group, in an amount at least sufficient to inhibit dusting of said dyestuff but not exceeding 6% of the net weight of said dyestuff, until a substantially uniform mixture is produced.

12. A method of inhibiting dusting of a water-soluble organic dyestuff which is a salt of a dyestuff base with a non-dyeing acid which comprises milling said dyestuff with a liquid dialkyl ester of ortho-phthalic acid having not more than 4 carbon atoms in each alkyl group, in an amount at least sufficient to inhibit dusting of said dyestuff but not exceeding 6% of the net weight of said dyestuff, until a substantially uniform mixture is produced.

13. A method of inhibiting dusting of a water-soluble organic dyestuff which is a sodium salt of a dyestuff sulfonic acid which comprises milling said dyestuff with a liquid dialkyl ester of ortho-phthalic acid having not more than 4 carbon atoms in each alkyl group, in an amount at least sufficient to inhibit dusting of said dyestuff but not exceeding 6% of the net weight of said dyestuff, until a substantially uniform mixture is produced.

HELEN M. IAMARINO.
*Administratrix of the Estate of Joseph M. Iamarino, Deceased.*

REFERENCES CITED

The following references are of record in the file of this patent:

UNITED STATES PATENTS

| Number | Name | Date |
|---|---|---|
| 2,291,082 | Jarmus | July 28, 1942 |
| 2,335,804 | Silk | Nov. 30, 1943 |